Aug. 6, 1963    C. E. ARMSTRONG    3,099,924
SPROCKET FOR CHAIN SAWS
Filed Oct. 18, 1961    3 Sheets-Sheet 1
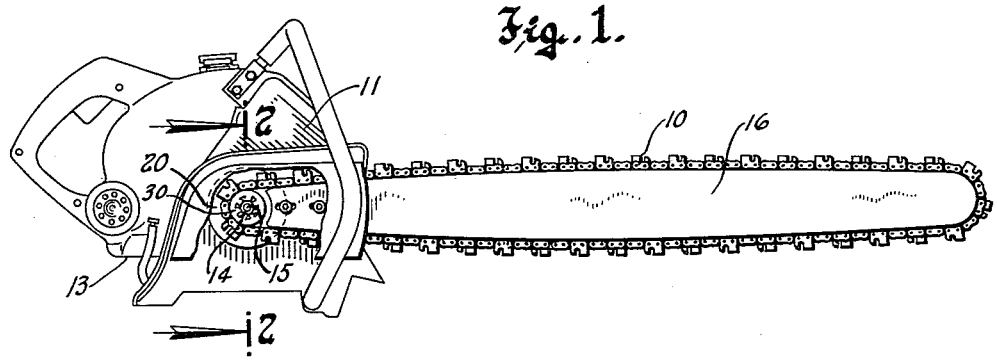
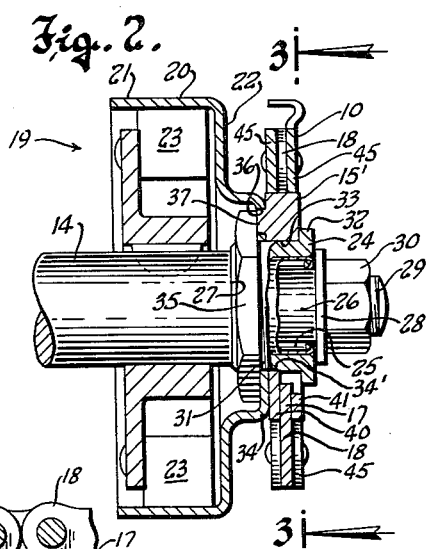
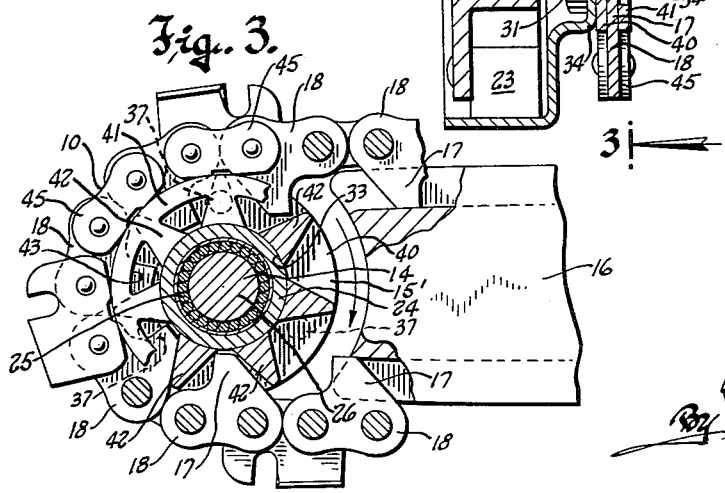
Inventor
Charles E. Armstrong

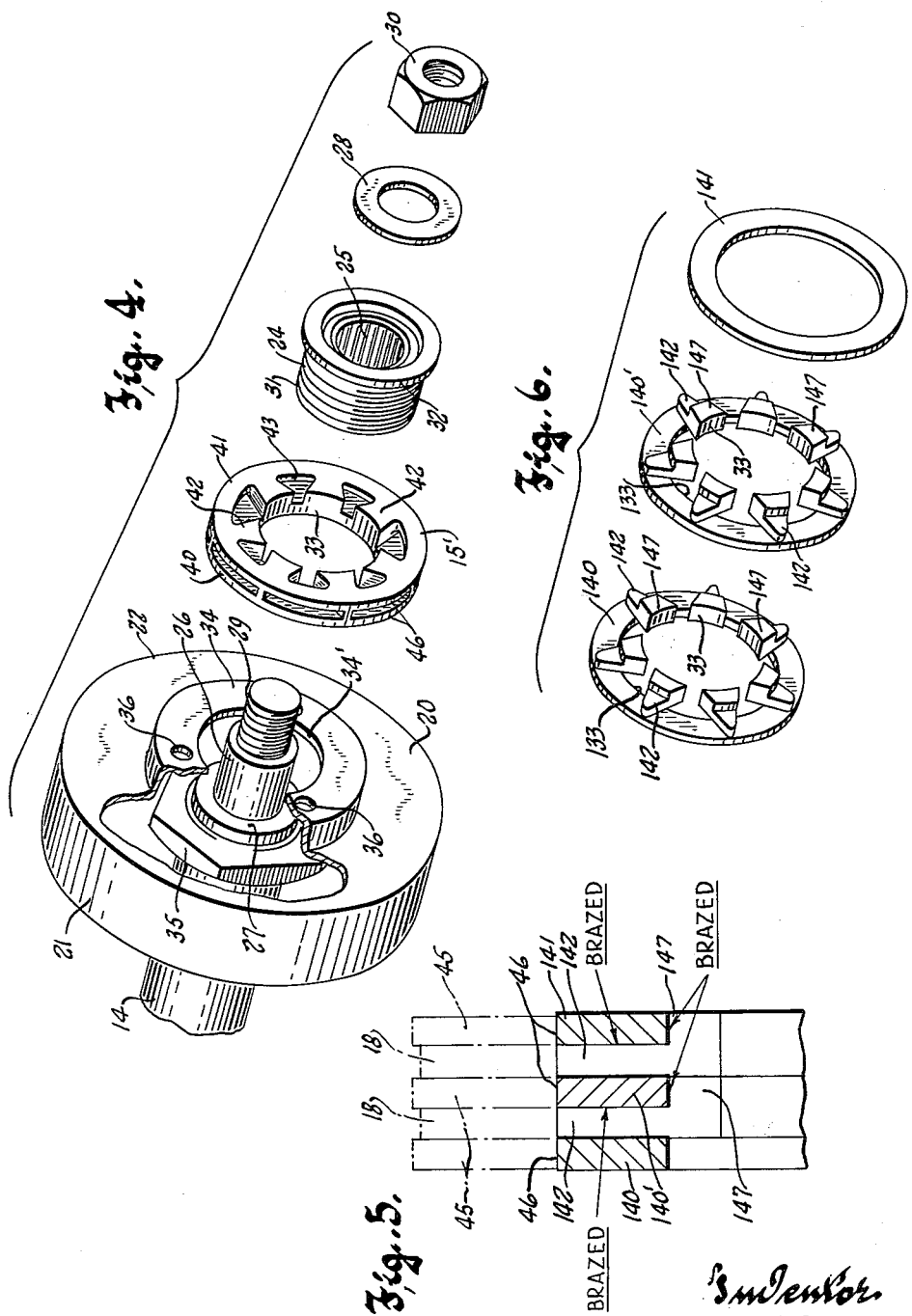

Aug. 6, 1963     C. E. ARMSTRONG     3,099,924
SPROCKET FOR CHAIN SAWS
Filed Oct. 18, 1961     3 Sheets-Sheet 3
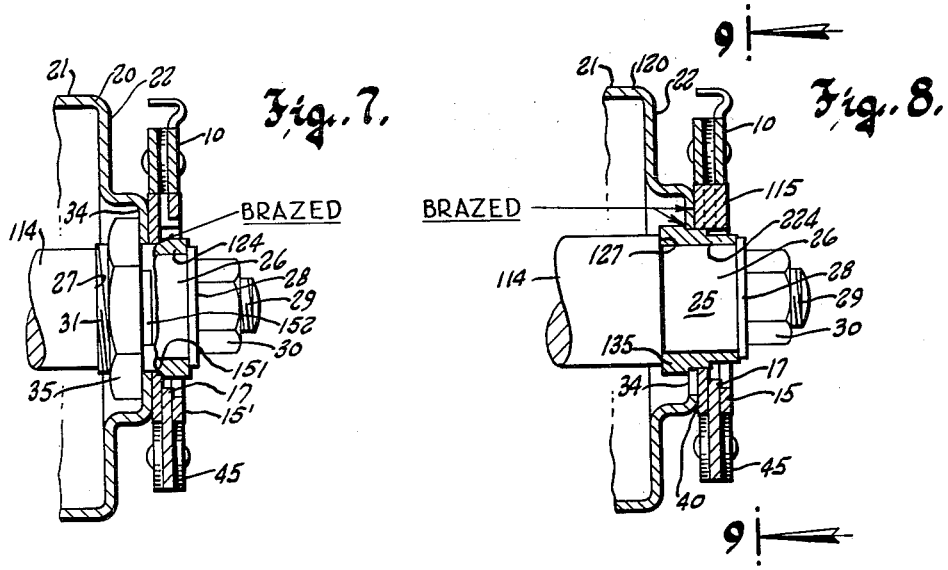
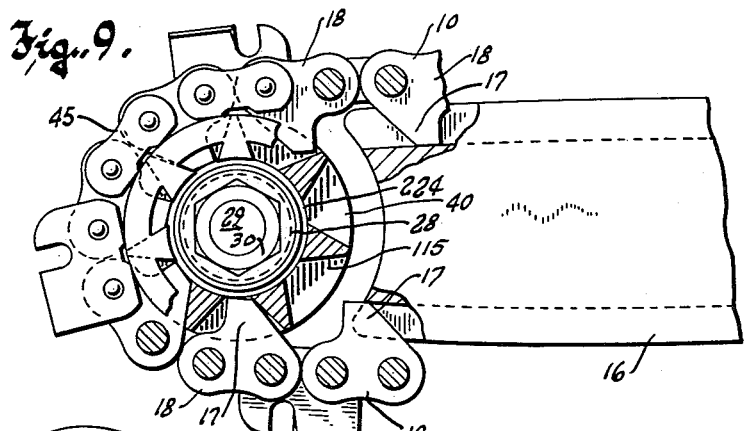
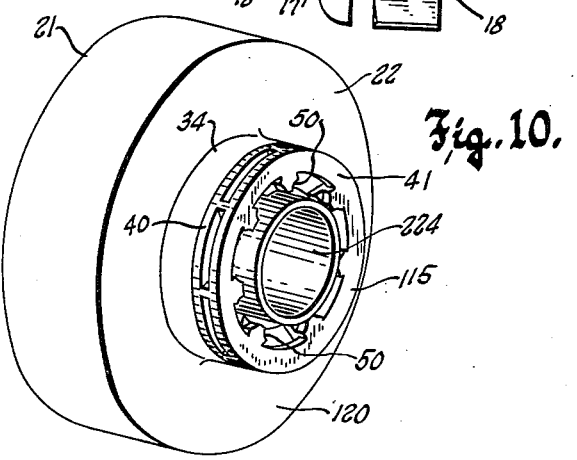

United States Patent Office 3,099,924
Patented Aug. 6, 1963

3,099,924
SPROCKET FOR CHAIN SAWS
Charles E. Armstrong, Belgium, Wis., assignor to Marine Associates, Inc., Fort Lauderdale, Fla., a corporation of Florida
Filed Oct. 18, 1961, Ser. No. 146,041
12 Claims. (Cl. 74—243)

This invention relates to chain saws and refers more particularly to improvements in the sprockets used in chain saws to transmit driving force from the drive shaft thereof to the saw chain.

This application is a continuation-in-part of my application, Serial No. 858,811, filed December 10, 1959, now abandoned, for "Drum and Sprocket Assembly for Chain Saws."

Chain saws generally comprise four major components, namely, an endless saw chain to do the actual cutting, an elongated bar or arm to support the chain and around the edges of which the chain is constrained to travel, power means usually comprising a prime mover such as a gasoline engine or an electric motor, and means to drivingly connect the drive shaft of the power means with the saw chain.

It is the improvement of the means affording this driving connection between the power shaft and the saw chain to which this invention is directed. Such a driving connection can, of course, be effected by training the saw chain over a drive sprocket fixed directly to the power shaft so that the saw chain is at all times drivingly connected therewith. This expedient is undesirable, however, and it is now common practice to maintain the saw chain out of driving relationship with the power shaft until the latter has achieved a predetermined speed of rotation.

For that purpose, the drive sprocket is ordinarily supported for rotation relative to the power shaft, and is drivingly connectable therewith by centrifugally responsive clutch mechanism. Such clutch mechanism, for example, may comprise a drum fixedly secured to the drive sprocket for rotation therewith, and a plurality of expansible friction shoes drivingly connected with the power shaft and movable radially outwardly into frictional driving engagement with a cylindrical wall on the drum as a consequence of rotation of the power shaft at a speed above a predetermined value, so that the saw chain cannot operate until the engine or other prime mover reaches a predetermined speed.

To assure that the sprocket and drum rotate in unison, the sprocket and drum have generally been fixed to one another and to a sleeve or bushing by means of which they are rotatably mounted by brazing, silver soldering, or an equivalent bonding operation. This expedient, however, did not alleviate the problem of rapid wear of the components comprising the drum and sprocket assembly, and moreover it created still another problem, namely, high replacement costs.

The rapid wear to which the chain drive of a chain saw is subject, creating the necessity for frequent replacement, constitutes a major and continuing source of annoyance to chain saw users. This is true not only because of the high costs of such replacements, but also because of the excessive loss of production, especially at times when it is difficult to obtain replacement parts. The chain drive sprocket is the component which must be replaced most often because of excessive wear on such vital surfaces thereof as the tips and sides of its teeth. This wear takes place despite the fact that the sprocket teeth have been carburized, and such wear causes the pitch of the sprocket to increasingly depart from that the saw chain. Thus, failure to replace the sprocket when necessary can and does result in early breakage of the saw chain.

The seriousness of this problem is evidenced by the fact that in some instances the case hardened drive sprockets now in use have lasted only for about 40 hours before the tips and flanks of their teeth became worn to such an extent that replacement was mandatory.

This intensive wear on the tips and flanks of the teeth of the drive sprocket was due primarily to the fact that both the drive links and the tie straps of the saw chain came into direct metal to metal rubbing engagement, under substantial pressure, with the smallest cross-sectional areas of each tooth, namely the tip, during every revolution of the sprocket. The tie straps bore edgewise upon the extremities of the teeth, while the drive links engaged the flanks of the teeth. Naturally, since the tip portions of the teeth are comparatively small in cross-sectional area in relation to the root portions of the teeth, the tips can be more readily worn away than can the other surfaces.

The acuteness of this problem is shown by the fact that chain saw manufacturers warn their customers that if the tip surfaces of the teeth of a drive sprocket are worn away more than about .010 inch, that small amount of wear is enough to cause the sprocket to be sufficiently out of pitch with the saw chain as to impair the efficiency of the sprocket and cause improper drive of the saw chain with resulting early breakage of the expensive chain.

It is an object of this invention, therefore, to provide a drum and sprocket assembly, for chain saws, that incorporates a drive sprocket which is far more durable than those of existing drum and sprocket assemblies, and yet less expensive to produce and replace.

More specifically, it is an object of this invention to provide a drum and sprocket assembly of the character described, the components of which are simply but effectively held releasably secured together so that the drive sprocket may be readily replaced when necessary without wastefully discarding the drum.

It is likewise an object of this invention to provide a drive sprocket for chain saws, which not only has teeth to engage and drive a saw chain but also has uninterrupted and long wearing smooth surfaces alongside the teeth and upon which the edges of the tie straps of the saw chain are adapted to bear to prevent wear on the extremities of the sprocket teeth hitherto caused by edgewise engagement of the tie straps therewith.

More specifically, it is an object of this invention to provide a drive sprocket having teeth which are protected against wear producing contact with the tie straps of a saw chain by the smooth uninterrupted peripheries of disc-like members between which the teeth are wholly confined.

Another object of this invention is to provide a drive sprocket for chain saws, having its teeth disposed between a pair of disc-like or annular members upon which the edges of the tie straps of the saw chain bear, and wherein substantially unobstructed axially opening outlets are provided for foreign matter which the chain may introduce into the inter-tooth spaces between the annular members during use of the saw.

Such provision for discharge of chips and the like is of great importance in a chain saw sprocket of the character described because if the spaces between the teeth of a saw chain drive sprocket should be even partially filled with compacted chips or shavings during use, such foreign matter would have the effect of changing the pitch of the sprocket teeth. The chain would thus be lifted partway up from the sprocket, and rapid and extreme wear upon the sprocket teeth and chain would result.

A further object of this invention is to provide a sprocket of the character described wherein the teeth and the annular members between which the teeth are disposed mutually reinforce one another, and which sprocket lends itself to economical production in hard metal, such as stainless steel, by the investment casting process.

Still another object of this invention is to provide a hubless driver for a chain saw chain having lengthwise spaced apart inwardly projecting drive tangs, which driver can be secured either permanently or readily detachably to a sleeve having a diameter that is relatively large in proportion to the outside diameter of the sprocket, so that the sleeve rotatably carries the driver and drum of a sprocket assembly and also performs the function of the hub of a sprocket of the type heretofore conventional.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed according to the best modes so far devised for the practical application of the principles thereof, and in which:

FIGURE 1 is an elevational view of a chain saw having portions broken away to show a sprocket and drum assembly of this invention incorporated in the saw;

FIGURE 2 is a longitudinal sectional view through the drum and sprocket assembly, showing the manner in which it is secured to the projecting end portion of a power shaft;

FIGURE 3 is a cross sectional view through the sprocket taken on the plane of the line 3—3 in FIGURE 2;

FIGURE 4 is an exploded perspective view of the drum and sprocket assembly of this invention;

FIGURE 5 is a fragmentary sectional view on a larger scale of a modified form of the driver of this invention, intended for use with multiple chains;

FIGURE 6 is an exploded perspective view of the driver shown in FIGURE 5;

FIGURE 7 is a longitudinal sectional view through a drum and sprocket assembly comprising another modified embodiment of this invention;

FIGURE 8 is a longitudinal sectional view similar to FIGURES 2 and 7 but showing still another drum and sprocket assembly embodying the principles of this invention;

FIGURE 9 is a view taken on the plane of the line 9—9 in FIGURE 8; and

FIGURE 10 is a perspective view of a drum and sprocket assembly similar to that shown in FIGURES 8 and 9, but having its driver somewhat modified.

Referring now to the drawings, wherein like reference characters have been applied to like parts throughout, the numeral 10 designates the endless saw chain of a chain saw that is powered by a prime mover 11. The prime mover may be a small internal combustion engine, as shown, mounted on the frame 13 of the saw with its crankshaft 14 projecting from one side of the engine for connection with the saw chain.

In the so called direct drive saw illustrated, the chain is trained about a drive sprocket 15 on the projecting end of the engine crankshaft, so that the crankshaft itself provides the power shaft. The chain, of course, is constrained to travel in an elongated orbit by means of a flat bar or arm 16 having a groove in its edges to guidingly receive the tangs 17 on the centrally disposed drive links 18 of the chain. It will be appreciated, however, that in the so called gear drive saws, the engine crank- shaft may be gear coupled with a separate power shaft having the drive sprocket splined, keyed or otherwise fixed thereto. In either event, one end of the bar 16 is secured to the frame of the saw at a location directly alongside the projecting end of the power shaft and the drive sprocket 15 thereon.

As is customary, the drive sprocket 15 is mounted on the power shaft for rotation relative thereto, and it is adapted to be drivingly connected therewith only when the shaft rotates at a speed in excess of a predetermined minimum. A centrifugal clutch mechanism 19 of a conventional type is employed for that purpose.

The clutch mechanism, for example, generally comprises a cup-like drum 20 freely rotatably supported on the projecting end portion of the power shaft, and having a cylindrical side wall 21 projecting toward the engine from the bottom or end wall 22 of the drum. A plurality of friction shoes 23 inside the drum, constrained to rotate with the power shaft, are expansible into frictional driving engagement with the cylindrical side wall of the drum, against yielding bias tending to resist such expansion, as a consequence of centrifugal force as the power shaft exceeds said predetermined minimum speed of rotation to establish a rotation transmitting connection between the power shaft and the drum.

In accordance with the principles of this invention, the sprocket 15 and the drum 20 form part of a sub-assembly which is readily detachably mounted on the projecting end of the power shaft. The components of this sub-assembly are also capable of being easily disassembled to enable replacement of the individual components and particularly the chain engaging driver whenever it becomes worn to the point of endangering the saw chain, without necessity for discarding the drum as was the case in previous chain saws. This sub-assembly includes a sleeve 24 which serves as a bushing of a size to freely rotatably fit a reduced outer end portion 26 of the power shaft 14, and which can have a needle bearing 25 confined in its bore. When installed on a chain saw, the sleeve is more or less confined lengthwise between the shoulder 27 at the inner end of the reduced portion 26 and a washer 28 held on a further reduced and screw threaded extremity 29 of the shaft by a nut 30. The washer 28 engages the shoulder at the outer end of the shaft portion 26 and does not clamp the sleeve against the inner shoulder 27.

At its exterior, one end of the sleeve 24 is screw threaded as at 31, and its opposite end has a circumferential flange 32 thereon. The bushing provided by this sleeve is applied to the reduced extremity 26 of the power shaft with its threaded end 31 facing the shoulder 27 on the shaft and with its circumferential flange 32 outermost.

The annular chain engaging driver 15' which together with the sleeve 24 comprises the sprocket 15 of this invention has a bore 33 of a size to rather snugly but slidably receive the sleeve 24, to enable the driver to be readily slid over the threaded end 31 of the sleeve and forwardly therealong until it abuts the circumferential flange 32 on the outer end of the bushing.

The bushing provided by the sleeve 24 also serves as the means by which the drum 20 of the centrifugal clutch mechanism is freely rotatably supported on the outer end portion of the power shaft. For this purpose, the central portion 34 of the end wall of the cup-like drum is flatwise offset a distance axially outwardly, away from the interior of the drum to provide a hub having a central aperture 34' therein of a size to snugly but slidably receive the sleeve 24. When in position on the sleeve, the hub 34 flatwise bears against the driver 15' so that the sprocket is confined between the hub of the drum and the circumferential flange 32 on the outer end of the bushing.

The diameter of the axially offset hub 34 of the drum is preferably substantially the same as the outside diameter of the annular driver 15', and thus at least large enough to enable a retaining nut 35 to be threaded over the inner end of the sleeve and against the inside of the hub to thus provide for securely clamping the driver against the flange 32 on the outer end of the sleeve. Moreover, the depth or degree of axial offset of the wall 34 on the drum is at least great enough to enable the retaining nut 35 to be fully received within the well thus provided in the central portion of the drum bottom.

The hub 34 of the drum has one or more holes 36 therein in which protuberances 37 on the adjacent face of the driver engage to provide an axially separable rotation transmitting connection between the drum and the driver.

Consequently, it will be seen that the sleeve or bushing 24 freely rotatably mounts the drum and driver upon the outer end portion of the power shaft to enable the latter to rotate relative thereto, and so that the shaft is drivingly connected with the drum and hence the driver only upon rotation of the shaft at a speed sufficiently great to cause the friction shoes 23 within the drum to be centrifugally expanded into frictional driving relationship with the cylindrical wall 21 of the drum.

Whenever it becomes necessary to remove the driver for replacement or inspection, it is only necessary to remove the nut 30 from the threaded extremity of the power shaft and slide the drum and sprocket assembly forwardly off of the shaft. Thereafter, the retaining nut 35 may be removed from the inner end of the sleeve so that the drum and the driver may be slid off of the threaded end of the sleeve and separated for inspection. If the driver is replaced with a new one, the drum 20 may still be used if it is found to be in serviceable condition.

The driver 15' of this invention may be produced most inexpensively if it is made as a one-piece casting, and though not essential, it will have optimum wear resisting qualities if it is cast from metals known as Stellite "6" or Stellite "93." Stainless steel has also been found very satisfactory. When made by the investment casting process, for example, all of the surfaces of the driver may be held to very close tolerances without need for costly machining operations to be performed thereon. Moreover, a driver made from Stellite "93" will have about a 62 Rockwell C hardness throughout its entire body, to assure an extremely long life. In conventional case hardened drive sprockets of this type, the case was seldom more than .030 inch thick and the body beneath the case was relatively soft in comparison, so that the sprocket surfaces wore extremely rapidly once the hardened but thin case was penetrated.

As shown best in FIGURES 3 and 4, the annular driver 15' may be said to comprise a ring consisting of a pair of substantially flat opposing annular discs 40 and 41 having the same external diameter and teeth 42 cast integrally with and between the discs to hold them in spaced apart coaxial relation. It is particularly important to note that the outer extremities of the teeth 42 of the driver 15' do not project beyond the peripheries of the discs 40 and 41 between which they are confined.

The rear one of the annular discs or rings comprising the driver, designated by 40, lies flatwise against the exterior of the axially offset hub 34 of the drum and its central hole defines part of the bore 33 of the driver. The disc or ring 40 also has the protuberances 37 thereon which project from its rear face for engagement in the holes 36 in the axially offset hub of the drum in order to constrain the driver to rotate with the drum. In the sprocket assembly shown in FIGURES 2, 3 and 4 there are three such protuberances angularly equispaced from one another.

The front annular disc 41, though equal in outside diameter to the rear disc 40, has a larger central hole 43 than the rear disc. The radially outer portions of the teeth 42 are wholly confined between the two discs 40 and 41, but the radially inner or root portions of the teeth extend forwardly into the central hole in the front disc 41 to terminate flush with its flat front face and to form, in effect, radially inward extensions or reinforcements for the front disc. Attention is directed to the fact that the root portions of the teeth terminate in curved surfaces which are concentric to the central hole in the rear disc 40 and thus cooperate therewith to define the bore 33 of the driver.

The construction described thus far is important to the successful practice of the investment casting process for the production of the driver of this invention. Note that the spaces between the driver teeth not only open to the periphery of the driver through relatively long and narrow circumferentially extending slits and into the bore of the driver through relatively short circumferential slits, but these spaces also open axially forwardly through the central hole in the front disc 41.

Whereas a conventional sprocket has teeth which are joined together at their roots by a hub, from which the teeth project radially, the driver of this invention is characterized by circumferentially spaced teeth which are confined between annular discs secured to the axial extremities of the teeth, and has its teeth defining spaces between their root portions that open radially inwardly to a bore 33 through the annular driver. This relative disposition of the teeth and discs is highly advantageous in cases where the sprocket must have a small outside diameter and must also have a substantially large diameter bore for receiving a sleeve or the like. In such instances, the outside diameter of the driver teeth need be no greater than the root diameter of a conventional sprocket having the same size bore. In this connection it is to be observed that the bore 33 through the driver, in which the sleeve 24 is received, is at least as large as half the outside diameter of the driver.

The teeth 42 space the two discs 40 and 41 by a distance sufficient only to freely receive therebetween the tangs 17 on the drive links 18 of the saw chain. Hence, the tie straps 45 of the saw chain cannot contact the extremities of the teeth, as was the case heretofore, but are constrained to ride edgewise upon the smooth and continuous cylindrically surfaced tracks 46 provided by the peripheries of the discs 40 and 41. Thus it will be seen that the entire width of the driver need be only slightly greater than the overall width of the saw chain, and the tracks 46 provide endless surfaces which are admirably suited to edgewise support the tie straps of the saw chain without becoming rapidly worn.

From the description thus far it will be apparent that the driver of this invention may be said to comprise a metal annulus having far better wearing qualities than past drive sprockets and having teeth defined by narrow circumferentially extending recesses in its periphery converging and opening inwardly to the bore of the driver and to one axial face thereof, and which recesses provide opposite faces of large area on the teeth for engagement with the tangs on the drive links of a saw chain.

Though the driver is preferably made as a one-piece casting of stainless steel or Stellite as described, it may also be comprised of two or more piece parts as disclosed in FIGURES 5 and 6, which illustrate a driver for a multistrand chain.

A driver of this type intended for a chain having two laterally adjacent rows of drive links 18 with tangs to engage sprocket teeth would comprise a unitary ring consisting of three separate coaxial annular discs, brazed or otherwise bonded together. The peripheries of these discs provide endless cylindrical tracks for the tie straps 45 of the chain and are of course of equal outside diameters. The front disc 141 of the group is merely a ring. The other two discs 140 and 140' are identical with one another and each has teeth 142 formed integrally with it and projecting from its flat front face to the rear face of the forwardly adjacent disc, to which the teeth are bonded. The root portions of the teeth extend radially inwardly of the central hole 133 in each disc and their radially inner ends thus define the bore 33 in the driver, to which the spaces between the teeth open. The teeth on each disc 140 and 140′ may lie wholly forwardly of the plane of its front face and have forward projections 147 on their root portions that extend into the hole in the forwardly adjacent disc to locate the latter and hold the discs coaxial. The projections 147 are a very desirable feature, since they hold the discs in proper concentric relationship while the discs are being brazed together, eliminating the necessity for putting the discs on a mandrel. The projections also serve to reinforce the forwardly adjacent disc in the finished driver. It will be understood that the teeth on the several discs are axially in line with one another.

The embodiment of the invention illustrated in FIGURE 7 is similar to that of FIGURES 2–4 in that the sprocket assembly is readily separable from the drum 20, but it differs in that its driver 15′ and sleeve 124 are permanently secured together, as by brazing, and the inner extremities of its teeth are radially spaced from the portion of the sleeve surrounded thereby. The driver 15′ may be a one-piece precision casting, generally like that shown in FIGURES 2–4, or its front disc may be a separate part brazed or otherwise permanently bonded to the teeth in the manner disclosed in FIGURES 5 and 6. The sleeve 124 has a reduced diameter rear end portion that defines a rearwardly facing shoulder 151, and this smaller diameter portion of the sleeve is engaged in the hole in the rear disc 40, with the shoulder 151 engaging the flat front face of said disc to provide for a secure brazed connection between the disc and sleeve. The rear end portion of the sleeve is threaded to receive a nut 35 which engages the rear face of the offset end wall portion 34 of the drum and holds the rear face of the driver snugly flatwise engaged against the outer face of said wall portion of the drum. The sleeve is provided with torque receiving means just to the rear of the driver 15′, where the sleeve passes through the end wall of the drum, by which the sleeve is constrained to rotate in unison with the drum, and this means can comprise, for example, diametrically opposite flats 152 on the sleeve, cooperating with a correspondingly shaped non-circular hole in the drum.

In the embodiments of the invention shown in FIGURES 8, 9 and 10 the driver 115 is permanently secured to the drum 120 and to a sleeve or bushing 224. The driver itself is a ring generally similar to that of the embodiment of the invention illustrated by FIGURES 2–4. The medial portion of the sleeve has an outside diameter of a size to fit snugly in the bore in the rear disc 40 of the ring and in a concentric bore of the same diameter in the offset portion of the end wall in the cup-like drum. The rear end portion of the sleeve, however, has a larger diameter to provide a head 135 which engages the inner surface of said offset portion of the drum end wall. The sleeve is brazed or otherwise bonded to the drum and to the rear disc 40 of the ring to provide a permanent driving connection between the drum and the sprocket assembly by which they are held concentric with one another.

The sleeve is of course freely rotatable on a bearing 25 on the front end portion of the power shaft 114 and is rotatably confined thereon between a forwardly facing shoulder 127 on the shaft and a washer 28 which is held in place by a nut 30 threaded onto the forward extremity of the shaft.

In the embodiments of the invention illustrated in FIGURES 8, 9 and 10, special provision is made for insuring that foreign matter introduced into the slit-like spaces between the ring teeth can readily work its way out of the ring axially forwardly between and under the root portions of the teeth, and from beneath the front disc.

Chips and sawdust, especially when laden with pitch or oils, tend to accumulate in the spaces between the inner end portions of the teeth. Moreover, such accumulations tend to be compacted against the exterior of the sleeve by the tangs 17 on the chain, and the build up of such compacted material can cause the tangs to lift the tie straps out of engagement with the tracks provided by the peripheries of the annular discs 40 and 41. This, of course, has the effect of so changing the pitch of the sprocket that the entire load is exerted upon the radially outermost portions of the sides of the teeth. Obviously, such a condition, if permitted to continue for any length of time, would cause serious damage to the chain as well as the driver.

To assure against foreign matter becoming entrapped in the driver and thus from building up around those portions of the sleeve exterior that are exposed at the spaces between the bottom portions of the driver teeth, the portion of the sleeve that extends forwardly from the rear disc 40 of the driver is turned down to a smaller diameter than that portion upon which the rear disc of the driver seats, so that spaces exist between the radially innermost ends of the teeth and the outer surface of the sleeve. Hence the drive tangs of the chain can readily move sticky sawdust and the like radially inwardly beyond the inner extremities of the driver teeth as well as axially forwardly through the large spaces between the teeth, under the front annular disc, and along the exterior of the sleeve. In this respect, the radial spaces between the sleeve and the inner ends of the teeth provide additional escape paths for sticky materials that ordinarily tend to accumulate at the bottoms of the teeth.

It is to be noted that the diameter of the washer 28 should be no larger than the outside diameter of the sleeve at the front end of the latter, so that the washer does not interfere with the escape of foreign matter from the driver.

In the further modified embodiment of the invention shown in FIGURE 10, the forward projections on the root portions of the teeth that lie beneath the front disc 41 have their corners cut away as at 50, or in other words have a radially inward taper, to further insure free forward escape movement of sawdust and the like introduced between the discs. However, the root portions of the teeth themselves, lying between the planes of the opposed inner faces of the discs, are of normal sprocket tooth configuration so as to provide the maximum possible surface area engageable with the tangs 17 on the chain.

From the foregoing description it will be evident to those skilled in the art that this invention provides an improved drum and sprocket assembly for chain saws and the like wherein the individual components of the assembly can be readily disassembled from one another and which features an improved self-cleaning chain drive sprocket that will far outlast drive sprockets of the type conventionally employed heretofore. It will also be apparent that the hubless driver of this invention is particularly useful in situations where a sprocket is required that has a bore for a sleeve, shaft or the like, which bore is of substantially large diameter in relation to the outside diameter of the sprocket.

What is claimed as my invention is:

1. A driver for a multiple chain of the type having laterally opposite tie straps arranged end to end in a number of spaced apart rows along the length of the chain and drive links in the spaces between said rows connected by said tie straps and having sprocket engaging drive tangs that project from the inside of the chain, characterized by: a unitary hubless ring comprising a group of annular coaxial spaced apart discs, one for each row of tie straps, said discs having peripheries of equal diameter to provide endless tracks to edgewise support the tie straps of a chain trained over the ring, said discs having flat opposing faces which are normal to the ring axis and between which the drive tangs of a multiple chain trained over the driver are receivable; and circumferentially spaced teeth on the ring in the spaces between each pair of adjacent discs, and holding the discs in fixed spaced apart relation, each tooth having elongated substantially radially extending surfaces one of which is engageable with the drive tangs of a multiple chain trained over the ring, said teeth lying wholly within boundaries defined by the periphery of the ring and its bore, the spaces between circumferentially adjacent teeth registering axially in the group of discs and opening radially to the periphery of the ring and to its bore, and also to one axial face of the ring, and the inner ends of the teeth terminating in circumferentially spaced arcuate surfaces that cooperate to define the bore in the ring.

2. A driver for an endless chain of the type having endwise adjacent flat drive links connected by pairs of tie straps that flatwise embrace the drive links, and having tangs on the drive links projecting edgewise therefrom at the inside of the chain and providing sprocket tooth engaging driving faces that are accurately and uniformly spaced apart along the length of the chain, said driver being characterized by: a sleeve which serves as a hub for the driver to provide for mounting the same on a power shaft, a front portion of the sleeve being reduced in diameter; a rear disc mounted on the sleeve rearwardly adjacent to its reduced portion, and having a flat front face; a plurality of circumferentially spaced teeth on said disc projecting axially forwardly from the front face thereof, all portions of said teeth surrounding a part of said reduced front portion of the sleeve and being spaced radially outwardly therefrom, and said teeth extending radially from near the bore in the rear disc to the periphery thereof, the spaces between the teeth communicating with said space around the reduced portion of the sleeve and each of said teeth having an elongated substantially radial surface adapted for engagement with the driving faces on the tangs of a chain; and a front disc secured to said teeth and held thereby coaxial with the rear disc, said front disc having a flat rear face normal to the driver axis and having an outside diameter equal to that of the rear disc so that the peripheries of the two discs provide a pair of endless tracks which are adapted to support the tie straps of a chain trained over the driver, said front disc also having a bore therein which is substantially larger in diameter than said reduced front portion of the sleeve to provide forwardly opening exits between the radially inner portions of the teeth for foreign matter introduced into the spaces between the discs by a chain trained around the driver.

3. The driver of claim 2, further characterized by the fact that forward portions of the teeth project radially into the hole in the front disc to reinforce the same.

4. The driver of claim 3, further characterized by the fact that said forward portions of the teeth are radially inwardly convergent to further facilitate the discharge of foreign matter from the spaces between the teeth.

5. A driver for a chain of the type having tie straps that embrace and connect links which have spaced drive tangs exposed at the inside of the chain, comprising: a sleeve which provides a hub and has a reduced rear portion providing a rearwardly facing external shoulder on the sleeve; torque receiving means on the sleeve, through which rotation may be imparted to the driver; and a ring nonrotatably seated on the sleeve to form a subassembly therewith, said ring comprising a pair of annular coaxial discs having peripheries of equal diameter and spaced apart flat opposing faces which lie in planes normal to the sleeve axis, the rear disc having a central hole of a size to fit the reduced rear portion of the sleeve and bearing against said shoulder thereon, and the front disc having a hole substantially larger in diameter than that of said front portion of the sleeve and encircling the latter in radially spaced relation thereto, and circumferentially spaced teeth on the ring in the space between said discs, holding the latter in such axially spaced relation that the peripheries of the discs provide endless cylindrical tracks that are adapted to edgewise support the tie straps of a chain trained over the ring while the space between the discs and between adjacent teeth are adapted to receive the drive tangs of the chain, and the spaces between teeth opening radially inwardly to said larger diameter front portion of the sleeve and axially to the front of the ring through the central hole in said front disc, to provide for axial discharge of foreign material introduced into the ring by a chain trained thereover.

6. The driver of claim 5, wherein the ring is permanently bonded to the sleeve, and wherein the teeth are radially spaced from the sleeve.

7. The driver of claim 5, wherein the reduced rear portion of the sleeve is externally threaded to receive a nut.

8. A driver for a chain of the type having drive links that are located between and joined by endwise adjacent pairs of tie straps, with sprocket engaging tangs formed on the drive links and projecting from inside of the chain, said driver being characterized by: a unitary hubless ring comprising coaxial annular discs having peripheries of equal diameter and having spaced apart opposing flat faces that are normal to the ring axis; circumferentially spaced teeth on the ring, integral with one of the discs and fixed to the other of the discs, said teeth bridging the space between said opposing faces of the discs and holding the discs in such axially spaced relation that their peripheries cooperate to provide a pair of endless cylindrical tracks that are adapted to edgewise support the tie straps of a chain trained over the ring, and each tooth having an elongated substantially radially extending surface that is engageable with the drive tangs of a chain trained over the ring, said teeth lying wholly within radial boundaries defined by the periphery of the ring and the smallest diameter portion of the ring bore, and the spaces between adjacent teeth opening radially to the periphery of the ring and to its bore, and also axially through said other disc; said other disc having a central hole which is larger in diameter than that in said one disc; and the teeth having integral root portions that extend axially away from the disc having the smaller hole and which provide supports upon which the disc having the larger diameter hole is edgewise seated.

9. The driver of claim 8, wherein said axially projecting root portions of the teeth converge radially inwardly to provide substantially large exits for foreign matter introduced into the spaces between the discs by a chain trained around the ring.

10. A driver for a multiple chain of the type having laterally opposite tie straps arranged end to end in a number of spaced apart rows along the length of the chain and drive links in the spaces between said rows connected by said tie straps and having sprocket engaging drive tangs that project from the inside of the chain, characterized by: a unitary hubless ring comprising a group of annular coaxial spaced apart discs, one for each row of tie straps, said discs having peripheries of equal diameter to provide endless tracks to edgewise support the tie straps of a chain trained over the ring, said discs having flat opposing faces which are normal to the ring axis and between which the drive tangs of a multiple chain trained over the driver are receivable; and circumferentially spaced teeth in the spaces between each pair of adjacent discs, integral with one disc of said pair and being secured to the opposing face of the other disc of said pair to hold the discs in fixed spaced apart relation, each tooth having elongated substantially radially extending outwardly converging surfaces one of which is engageable with the drive tangs of a multiple chain trained over the ring, said teeth lying wholly within boundaries defined by the periphery of the ring and the hole in its center, and the spaces between circumferentially adjacent teeth registering axially in the group of discs and opening radially to the periphery of the ring and to its bore, and also to one axial face of the ring; said discs being identical precision castings and each having circumferentially spaced teeth cast integrally therewith and projecting axially from one face of the disc; said teeth projecting radially inwardly beyond the center holes in the annular discs and having extremities which define the center hole in the ring; said ring having a toothless annular disc at one axial end of the group of discs, fixed to the axial extremities of the teeth of the adjacent disc; said discs being bonded together by brazed joints between the teeth of one disc and the face of an adjacent disc; and all of said discs except that at the opposite axial end of the group being seated upon axial extensions of the root portions of the teeth of an adjacent disc, which extensions are adapted to hold the discs in coaxial relation during brazing of the discs together.

11. A drive sprocket for an endless saw chain of the type having spaced drive tangs exposed at the inside of the chain, characterized by: an annular rear member having a bore and a smooth cylindrical periphery providing an endless track concentric to the bore, said annular member having a front face which lies in a plane normal to the axis of the bore; circumferentially spaced sprocket teeth on the annular rear member projecting axially forwardly from said face thereof and extending radially inwardly from the periphery thereof, the roots of the teeth terminating at the bore in radially inwardly facing circumferentially spaced arcuate surfaces that define forward extensions of the bore, the spaces between the teeth opening radially inwardly into the bore; an annular front flange on the sprocket coaxial with said rear annular member and spaced from said face thereof by the sprocket teeth, said flange providing a second track of a diameter equal to that provided by said annular rear member and cooperating with the latter to support a saw chain trained over the sprocket and to constrain the sprocket teeth to engagement with only the drive tangs of the saw chain, the diameter of the central aperture in said front flange being greater than that of said bore so that the spaces between the root portions of the sprocket teeth open axially through the central aperture in said front annular flange to the exterior of the sprocket; and means on the sprocket teeth defining forward projections on the radially inner portions thereof, which are encircled by said front flange and in effect form radially inward reinforcing extensions of the latter.

12. A driver for a chain of the type having drive links that are located between and joined by endwise adjacent pairs of tie straps, with sprocket engaging tangs formed on the drive links and projecting from the inside of the chain, said driver being characterized by: a unitary hubless ring having a bore and comprising coaxial annular discs having peripheries of equal diameter and having spaced apart opposing flat faces that are normal to the ring axis, and circumferentially spaced teeth bridging the space between said opposing faces of the discs and holding them in such axially spaced relation that their peripheries cooperate to provide a pair of endless cylindrical tracks which are adapted to edgewise support the tie straps of a chain trained over the ring; the spaces between the teeth opening radially to the periphery of the ring and to its bore; the teeth lying wholly within radial boundaries defined by the periphery of the ring and its bore and having root portions which terminate in radially inwardly facing arcuate surfaces that are spaced circumferentially of one another and cooperate in defining the ring bore; and inner edge portions of one of the discs being spaced radially outwardly of the ring bore at locations between the root portions of the teeth as to provide axial openings from the spaces between the teeth, at one side of the ring.

References Cited in the file of this patent

UNITED STATES PATENTS

| | | |
|---|---|---|
| 1,853,308 | Humphreys | Apr. 12, 1932 |
| 2,387,064 | Forrest | Oct. 16, 1945 |